(12) United States Patent
Leard et al.

(10) Patent No.: US 12,030,250 B2
(45) Date of Patent: Jul. 9, 2024

(54) PHASE CHANGE LIGHT VALVE SYSTEM

(71) Applicant: Seurat Technologies, Inc., Wilmington, MA (US)

(72) Inventors: Francis L. Leard, Sudbury, MA (US); James A. DeMuth, Woburn, MA (US); Andrew J. Bayramian, Marblehead, MA (US); Matthew Murachver, Long Beach, CA (US)

(73) Assignee: Seurat Technologies, Inc., Wilmington, MA (US)

( * ) Notice: Subject to any disclaimer, the term of this patent is extended or adjusted under 35 U.S.C. 154(b) by 64 days.

(21) Appl. No.: 17/513,005

(22) Filed: Oct. 28, 2021

(65) Prior Publication Data
US 2022/0134659 A1 May 5, 2022

Related U.S. Application Data

(60) Provisional application No. 63/107,077, filed on Oct. 29, 2020.

(51) Int. Cl.
*B29C 64/268* (2017.01)
*B29C 65/16* (2006.01)
*B33Y 30/00* (2015.01)
*B33Y 70/00* (2020.01)
*B29K 105/00* (2006.01)

(52) U.S. Cl.
CPC ............ *B29C 64/268* (2017.08); *B29C 65/16* (2013.01); *B33Y 30/00* (2014.12); *B33Y 70/00* (2014.12); *B29K 2105/251* (2013.01)

(58) Field of Classification Search
CPC ..... B29C 64/268; B29C 65/16; B29C 64/153; B33Y 30/00; B33Y 70/00; B33Y 10/00; B29K 2105/251; G02F 1/0147; Y02P 10/25; B22F 10/28; B22F 12/41
See application file for complete search history.

(56) References Cited

U.S. PATENT DOCUMENTS

| 5,090,795 | A | * | 2/1992 | O'Meara | G02B 26/06 359/240 |
|---|---|---|---|---|---|
| 5,283,600 | A | * | 2/1994 | Imai | G02B 27/285 353/34 |
| 7,382,512 | B2 | | 6/2008 | Chen | |
| 2006/0110125 | A1 | * | 5/2006 | Lin | B82Y 10/00 385/147 |
| 2009/0060301 | A1 | * | 3/2009 | Carver | G06V 10/147 382/128 |
| 2015/0049377 | A1 | * | 2/2015 | Zheludev | G02B 5/008 359/244 |
| 2017/0018688 | A1 | * | 1/2017 | Mazed | H01L 27/14621 |
| 2017/0120337 | A1 | | 5/2017 | Kanko et al. | |
| 2017/0182556 | A1 | | 6/2017 | Ramaswamy et al. | |
| 2017/0232515 | A1 | * | 8/2017 | DeMuth | G06F 30/17 419/53 |
| 2017/0239891 | A1 | | 8/2017 | Buller et al. | |

(Continued)

*Primary Examiner* — Nahida Sultana
(74) *Attorney, Agent, or Firm* — David R. Stevens; Stevens Law Group

(57) ABSTRACT

An additive manufacturing system includes a high power laser to form a high fluence laser beam at a first wavelength. A 2D patternable light valve having a phase change material responsive to a write beam at a second wavelength, and non-responsive at the first wavelength is used to pattern the high fluence laser beam.

10 Claims, 12 Drawing Sheets

(56) References Cited

U.S. PATENT DOCUMENTS

2018/0143147 A1     5/2018  Milner et al.
2018/0326664 A1*   11/2018  DeMuth .................. B22F 12/49
2020/0198060 A1     6/2020  Bayramian et al.

* cited by examiner

PHASE CHANGE LIGHT VALVE SYSTEM

RELATED APPLICATION

The present disclosure is part of a non-provisional patent application claiming the priority benefit of U.S. Patent Application No. 63/107,077, filed on Oct. 29, 2020, which is incorporated by reference in its entirety.

TECHNICAL FIELD

The present disclosure generally relates to operation light valve systems that include phase change materials. More particularly, use of phase change materials differently responsive at different wavelengths are used to enable respective write and high fluence beams.

BACKGROUND

High power laser systems with able to be operated at high fluence for long durations are useful for additive manufacturing and other applications that can benefit from use of patterned high energy lasers.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
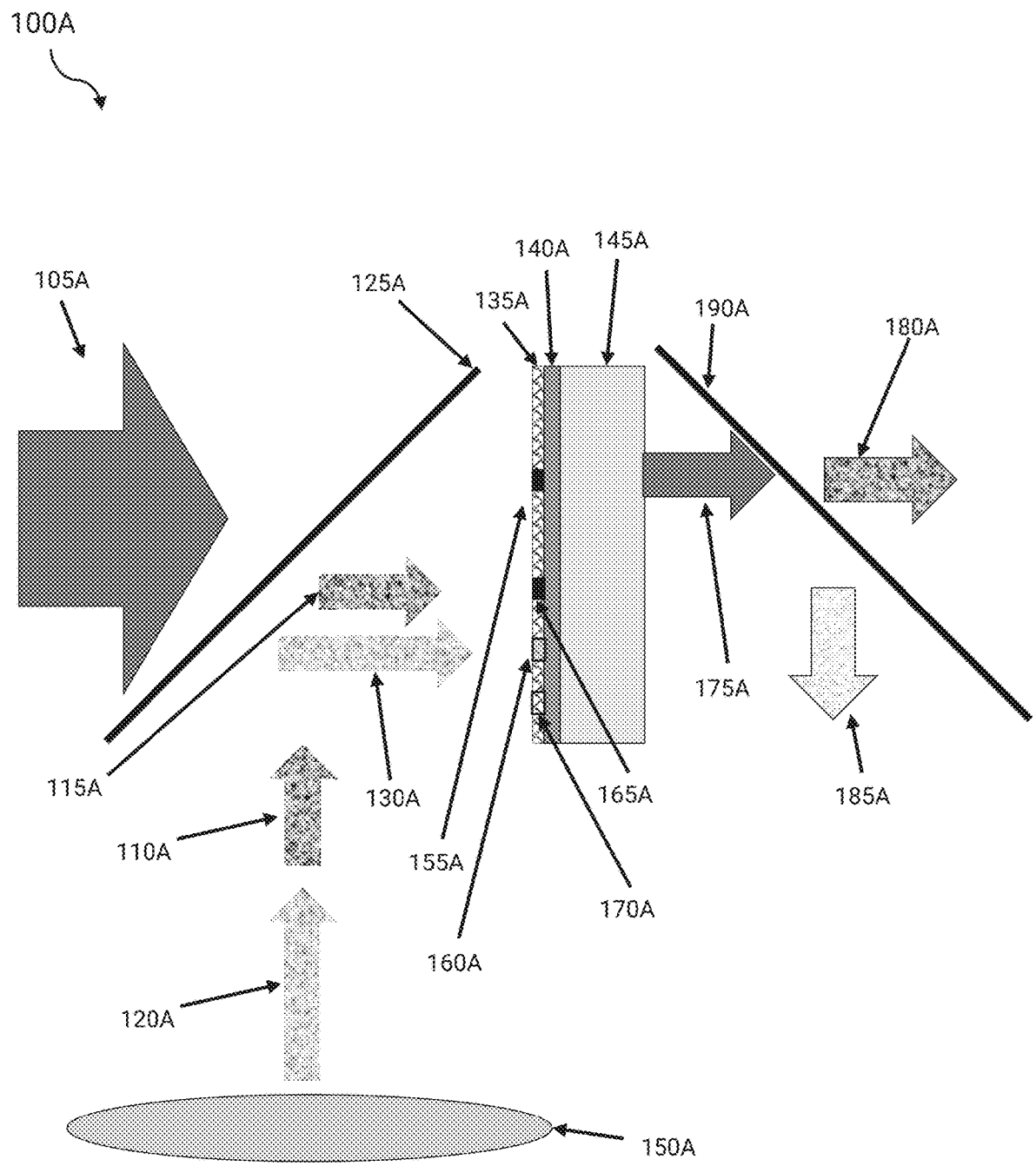
FIG. 1A illustrates use of phase change cooling within a light valve structure.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, an additive manufacturing system includes a high power laser to form a high fluence laser beam at a first wavelength. A 2D patternable light valve having a phase change material responsive to a write beam at a second wavelength, and non-responsive at the first wavelength is used to pattern the high fluence laser beam.

In some embodiments, the phase change material supports volumetric phase change.

In some embodiments, the phase change material is a quantum dot phase change material.

In some embodiments, the phase change material is a metamaterial phase change material.

In some embodiments, the phase change material is a pixel strained phase change material.

In some embodiments, the phase change material is a structured material.

In some embodiments, the phase change material is a non-linear material phase change material.

Light valve (LV) technology is limited in ability to switch pixel speeds due to its reliance on photoconductors and liquid crystal materials. Current devices commonly make use of group phenomena (e.g. accumulation of charge across a photoconductor or the accumulation of polarization retardation across a liquid crystal cell). In contrast, a phase change-based system locally modifies the state of the material to undergo a phase change from one state (crystalline) to another (amorphous) and in doing so modifies its response to high fluence light (reflection/transmission, polarization, phase, amplitude or wavelength). The resulting effect of phase change LVs is robustness in the presence of high fluence light, speed and/or added functionality.

Advantageously, phase change LVs do not require photoconductors or transparent conductive oxides (two structures within standard LVs that are failure prone to high fluence light) but rely instead on the molecular rearrangement from one state of material to another through the direct action of the write beam. Once the state change occurs (e.g. crystalline to amorphous), the material is stable with no modifying influences afforded by the high fluence light on the affected volume. The affected volume has a different influence on the high fluence beam with respect to those volumes that were not changed by the write beam. Additionally, by adjusting the intensity levels of the write beam, stress between the pixels and/or voxels in the affected volume can be actively adjusted so that different aspects (its polarization, phase, reflection, refraction, wavelength response) of the high fluence beam can be modified. In some variations of phase change LVs, the switching speed by which the high fluence beam can be modified is orders of magnitude faster than what is currently available in current LVs.

FIG. 1A illustrates a planar phase change light valve system 100A that uses phase change cooling within a light valve structure. An activating material is a thin film volume (135A) applied to a supporting substrate. In this arrangement, an unpatterned high fluence beam (HFL, 105A) passes through a beam combiner (125A) before entering 100A. The HFL operates at wavelength, $\lambda 1$, at a time with respect to the timing cycle of t1 and a pulse width of $\tau 1$. In optical memory applications, the wavelength is typically in the green (532 nm) or blue (450 nm). In this same type of applications, the pulse widths are typically in the picoseconds (<1 ns, <0.1 ns, <10 ns, or <100 ns) for the Write beam and 10 to 500 microseconds for the erase beam. A patterned lower fluence Write beam (110A) reflects off 125A and enters 100A as 115A. The Write beam operates at λ2 and becomes activated at t2 and has a pulse width of τ2 and a fluence of E1. Additionally, to 110A, a there is includes a patterned Erase beam (120A) operating at either λ2 or λ3 but being time synched so that it is present only after 110A (if both are operating at λ2) with t3>t2+τ2, a pulse duration of τ3, and a fluence E2. In some embodiments, the Erase beam can operate simultaneously with the Write beam, with operation at λ3 with the same timing requirements (t3 and τ3) as above. Simultaneous operation of the Write and Erase beams (given the thin film nature of the media) is allowed if they do not operate on the same pixels. 120A becomes 130A after being reflected off 125A before entering 100A.

As an example of a Phase Change LV operation where the Write and Erase beams operate at the same wavelength (λ2). The Write (110A) and Erase (120A) beams have fluences and pulse widths of E1/E2 and τ2/τ3, respectively, where E1>E2 and τ2<τ3. The Write beam illuminates a phase change LV that contains a typical 150 nm to 2 um thick crystalline germanium-antimony-tellurium (Ge2Sb2Te5, aka GST, 135A) film which sits atop a seed layer (140A) composed of an equivalent crystalline structure, such as sodium chloride or NBK7 glass. The Write beam is activated at t2 and its fluence and wavelength is such that it causes GST film to undergo a phase change from crystalline to amorphous in the areas where the film is illuminated. 110A's pulse width (τ2) is, in one embodiment, 2-3 picoseconds in pulse duration, and when 110A is switched off, the amorphous volume freezes as amorphous.

The refractive index change can be large when the material goes from crystalline to amorphous, in the case for GST, its crystalline index of refraction is typically 6.5 changing to 3.85 in its amorphous state. Additionally, 135A can be birefringent in its crystalline state and homogeneous in is amorphous state. If the LV operates on Total Internal Reflection or other index sensitive means to image wise modify the HFL (105A), then by causing 135A to drastically change its index in a determined way, would allow 105A to have this pattern imposed on it by allowing it to pass through a previously (when 135A was crystalline) defined reflective surface. If the LV operates by polarization, then changing 135A from a birefringent crystal to homogeneous material switches off the material polarization modifying attribute and 105A would have the Write beam pattern imposed on it.

The Erase beam (120A) strikes the written area and due to its fluence, wavelength and pulse width, presents a low power version of the Write beam over a longer time frame. 120A raises the temperature of the amorphous regions of 135A to above its glass transition point and holds it there until recrystallization occurs in the affected volumes due to features inherent in the seed layer templates or in neighboring unaffected volumes. The pulse width τ3 of 120A is typically in the tens of nanoseconds (for GST).

On 100A, the thin film phase change media, 135A can be several different materials including a large number of chalcogenide glasses such as GST, $Sc_{0.2}Sb_2Te_3$, GeTe, $Ag_4In_3Sb_{67}Te_{26}$, $Ge_{15}Sb_{85}$, or Sb. Additionally, polycrystalline materials such as CdTe, AZO, ZnSe, ZnS, or Si can be used. In some case nonlinear aspects of Liquid Crystals can be used in which the non-linearity causes a phase change in the liquid crystals and their arrangements. In addition, quantum dots, artificial dielectrics, or metamaterials composed of above mentioned groups of discrete materials (chalcogenides, polycrystalline or nonlinear liquid crystals) can be used in 135A. This thin layer can be deposited onto a coated supporting substrate (145A) or onto an intermediate layer, 140A, that can acts as a baseline seeding structure, an antireflective stack, a thermal dissipative or insulative layer or a general interface to the supporting substrate to aid adhesion and the films functionality.

The HFL that enters 105A and interacts with the affected pattern imposed onto 135A by the actions 110A leaves 100A and becomes 175A, containing both patterned and unpatterned HFL light. This beam strikes a pattern discriminator, 190A which splits the pattern HFL light 180A from the unpattern light 185A. The 180A gets imaged to the bed while 185A goes into a beam dump or gets reformatted or otherwise processed. The pattern discriminator depends on what attribute is being used to differentiate 180A from 185A. In the case of changes to 135A's birefringence, then 190A is polarizing beam splitter; if it is phase, then 190A could be interference structure or similar coherent structures that can translates phase to amplitude.

Advantageously, as compared to conventional LVs, phase change LVs are composed of materials that have a higher inherent laser damage threshold. Once information is written into Phase Change LVs, the LV interacts with the HFL beam without the HFL affecting the LV's state.

One embodiment takes advantage of long term phase change pattern latency. Common patterns that needs to be printed in various areas of the print bed can be written and be provide a pseudo static image without the need for additional 110A or 120A light until a change or modification is needed.

Figure 1B:
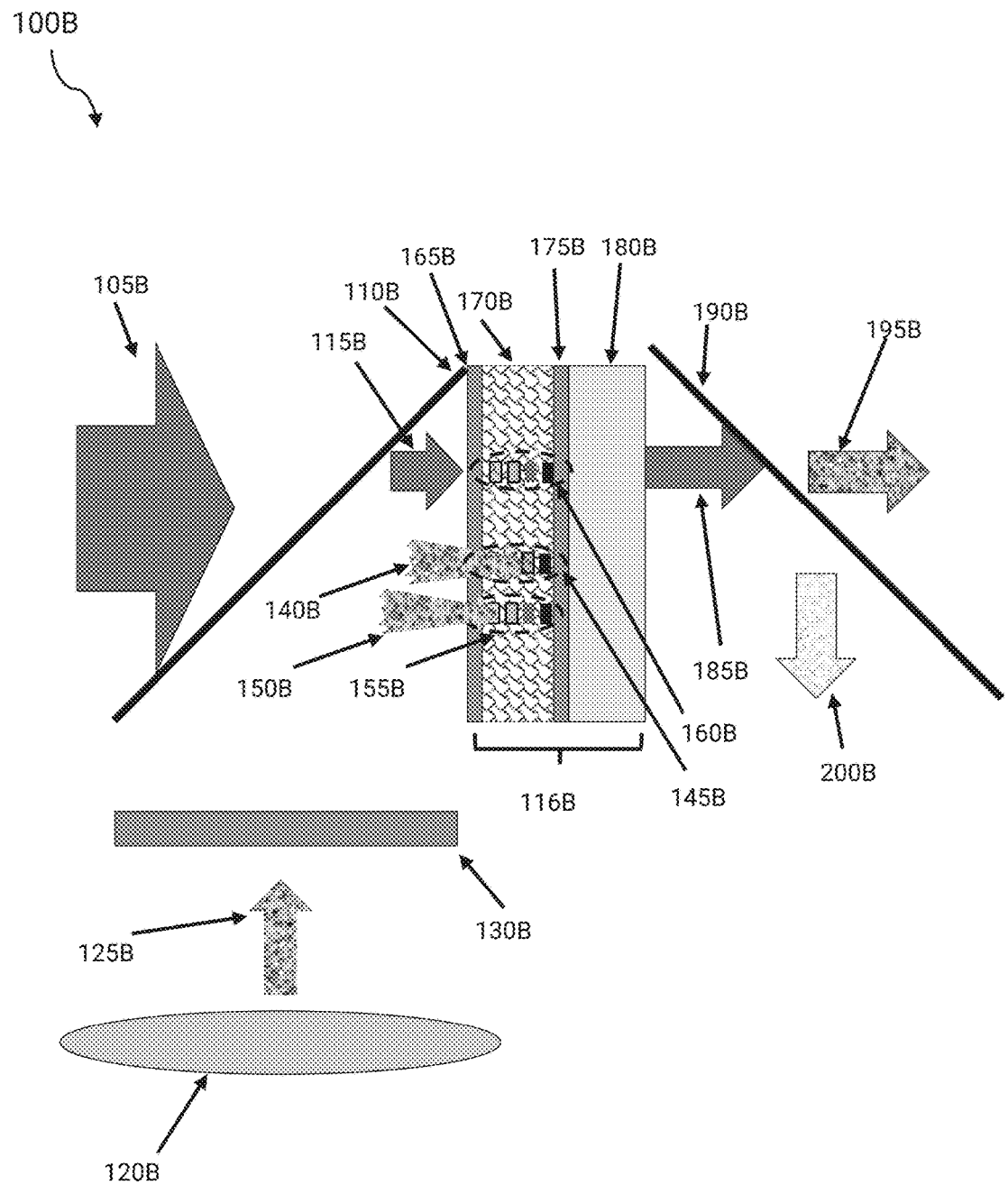
FIG. 1B illustrates a volumetric phase change light valve.

FIG. 1B illustrates a volumetric phase change light valve 100B. Unpatterned HFL light operating at λ1 and t1 with a pulse width of τ1, 105B, passes through the dichroic combiner, 110B, and becomes 115B before entering the volumetric Phase Change LV, 116B. Pattern Write/Erase beam light operating at λ½ and t½ with a pulse width of τ½, 125B, passes through imaging lens, 120B and Phase Delay Light Valve (130B) before reflecting off of 110B to become the Write beam (140B) or the Erase beam (150B). The 116B is composed of a top cladding/seed layer (165B), a volume of phase change material (170B), a bottom cladding/seed layer (175B), and a supporting substrate (180B). A pattern being written by 140B is depicted by 145B while a volumetric pattern being erased by 150B is depicted by 155B. A previously written pattern, 160B, acts upon 115B resulting in a HFL beam containing both pattern and unpatterned features (185B) that passes through a pattern separator (190B). The patterned HFL beam becomes 195B while the unpatterned beam (200B) gets diverted to a beam dump or gets reformatted or otherwise processed.

The volumetric phase change material is usually a crystalline material (same list as mentioned above) but could also be amorphous, liquid crystal, glass, ceramic, polymer, quantum dot, artificial dielectric, plasmonic, or metamaterial. The condition it must have is that it needs to be transparent and non-absorptive at λ1 (HFL wavelength) while being absorptive at λ2 and/or λ3 (write and erase wavelengths). Additionally, the phase change material could be a material that can exhibits a susceptibility non-linearity ($\chi 2$ or $\chi 3$) so it has no reactivity to λ1 but does have high reactivity to λ2 and/or λ3.

The phase change on exposure to at λ2 and λ3 is such that some aspect of at λ1 light would be modified, this includes optical phase delay/advancement (delay of the optical wave packet or group velocity), shift in the polarization vector, displacement of the volume's overall spectral response to at λ1, modification of the amplitude/intensity of 115B, change of the transmissivity or reflectivity of 170B with respect to 115B or a change in the emission angle of 185B with respect to incident angle of 115B.

The phase change within 170B can be very localized and discrete as exemplified by 160B with discrete changes voxels or it could be gray scale continuous across the span of 170B, depending on the gray scale value of the pattern contained in 140B and 150B. The depth ($\Delta z$) at which the writing or erasure takes place depends on the gray scale value imposed onto 140B/150B by 130B.

In one embodiment 140B and 150B can operate at $\lambda 2$ and $\lambda 3$, respectively; in which case they can operate on 170B simultaneously on adjacent voxels. If the desire is to write and erase in the same volume of material, then an additional embodiment would require a second 130B to act separately on at $\lambda 2$ and $\lambda 3$, this embodiment is not shown, but would require additional optical circuits prior to 120B.

Erasure of any voxel volume by 150B would use either the neighboring unaffected volume or features/structure of 165B and 175B to allow the phase change material to return to its native/initial state.

Figure 1C:
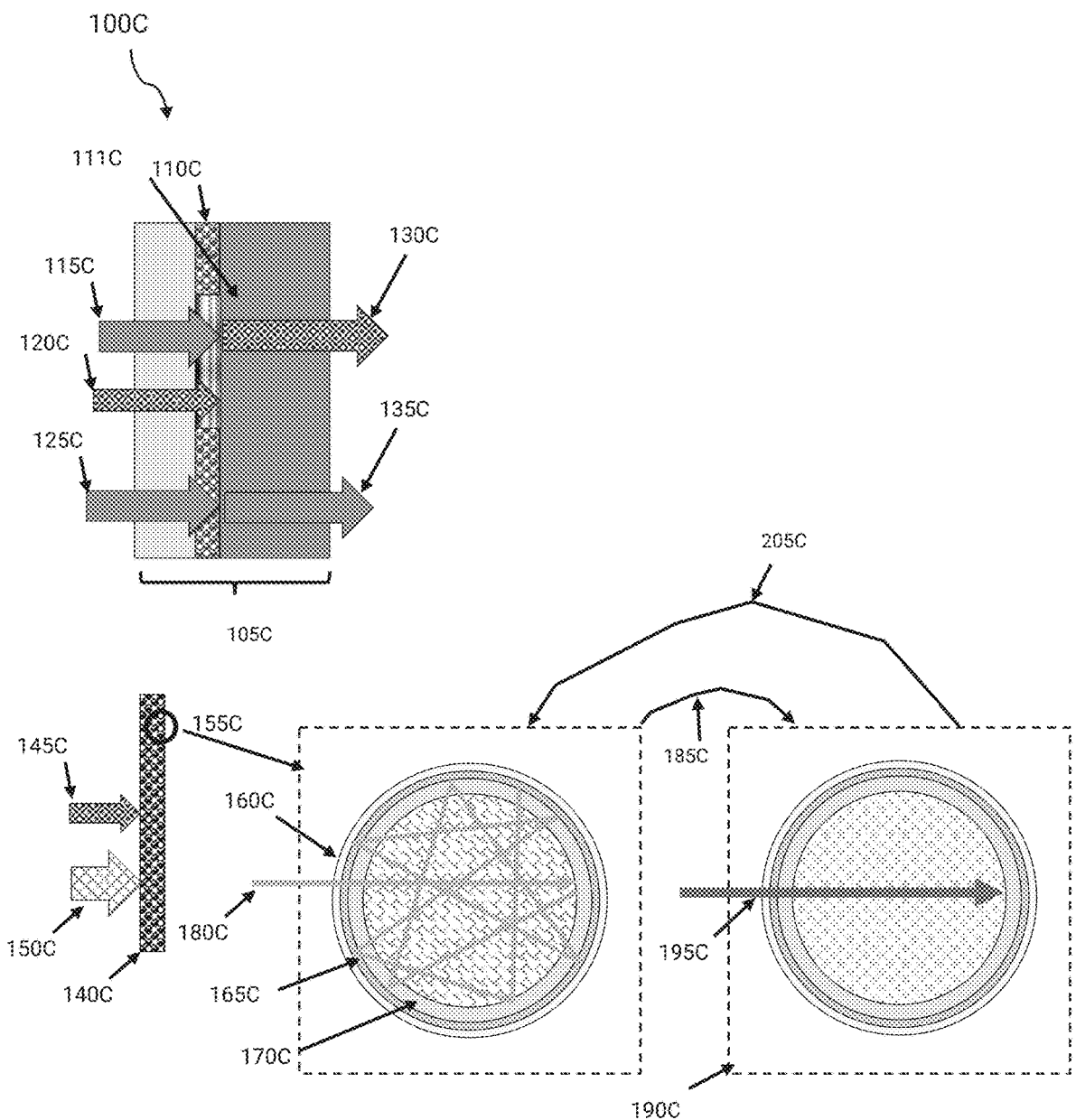
FIG. 1C illustrates a quantum dot phase change light valve.

FIG. 1C illustrates a quantum dot phase change light valve 100C. Phase change material (110C) can be either a planar structure (capable of taking on one discrete voxel) or volumetric (many discrete voxels in a column, gray scale voxels in the 3D volume, or analog gray scale across 3D volume, collectively depicted as 111C). An unpatterned HFL operating at $\lambda 1$ is incident on 105C in the area in which the volume of quantum dots within 110C have been modified by 120C. A patterned write beam operating at $\lambda 2$, I1, t1 with duration $\tau 1$ (wavelength, fluence, and time interval, respectively) enters 105C and acted on volume 110C before 115C enters this volume. The write beam causes the quantum dots to undergo a phase change so that their optical properties changes with respect to 115C, enabling 110C to affect 115C's amplitude, phase, polarization, or spectral response as it passes through 110C, thus changing 115C into 130C as it leaves 110C. The resulting patterned HFL (130C) leaves 105C and travels to the print bed. An unpatterned HFL beam enters into 105C in an area not addressed by 120C and is not affected by the unchanged quantum dots within 110C passing through and remaining an unpatterned HFL 135C which travels as waste light and gets transported into a beam dump, an image reformator, or a Switchyard system.

A closer examination of 110C is shown in 140C and is composed of quantum dots whose core can be composed of any of the materials mentioned above. The quantum dot is constructed so that its overall dimension is resonant with 115C, this resonance is dependent on the optical propertied of the core material in either its native state or in its phase changed state. When the core has been modified, then an aspect of its response to 115C changes so that affected volume of 110C will react differently or modify 110C differently than where it is unaffected by 120C or further modified by the erase beam 150C. The write beam (145C) enters 140C and causes the quantum dots that it illuminates to undergo a phase change. The core of quantum dot is composed of a material that has an absorption at $\lambda 2$ and $\lambda 3$ but has no absorption at $\lambda 1$.

A closer examination of the quantum dot is shown in 155C and is composed of a core 175C covered with a number of shells with the outermost shell (160C) resonant at $\lambda 1$ and with one or more of the inner shell dimensions being resonant with $\lambda 2/\lambda 3$. The inner shells contain a buffer layer (165C) and a seed layer (170C). There can be more shells than these two mentioned with the added requirement that 165C and 170C are not absorptive at any wavelength. A portion of 120C is incident on 110C and is shown as 145C being incident on a subsection of 110C depicted as 140C, likewise, a portion of 145C is shown being incident on a single quantum dot as 180C. Since an inner shell dimension is resonant at $\lambda 2$, 180C enters into 160C and undergoes multiple reflections inside 160C with its operating parameters of $\lambda 2$, I1, and $\tau 1$ causing the core to undergo a phase change from (as an example) crystalline to amorphous. This phase change results in an index and/or birefringence modification for 115C and a resonance change at $\lambda 1$. The modification will affect 115C as it passes through 155C and the ensemble of quantum dots in the voxel of 140C (and in turn 110C) where 120C activates. The phase change of the core is depicted as 190C and the phase change is depicted as the state of 155C changes to 190C along the path of 185C.

The erase beam (150C) operates at of $\lambda 2$ or $\lambda 3$, I2, t2 with a duration of $\tau 2$ is incident on 140C and causes the core of the quantum dots to undergo a phase change from (as an example) amorphous back to crystalline state with the aid of the seed shell layer (170C). Examination of the action of the erase beam that has a single quantum dot is represented by 190C where a subset of 150C is represented by 195C and is incident on a previously changed quantum dot. It enters the quantum dot and causes the core (200C) to undergo a phase change back to its original state, represented by the path 205C.

Since the volume of the quantum dot is much smaller than an equal volume of free standing phase change with the quantum dot's seed layer also similarly closer to the volume undergoing forward or erasure phase change, this would allow a 105C to activate/erase much faster than a standard volumetric or planar phase change LV.

Another embodiment has one of the shell layers (for instance 170C) selected to be absorptive at $\lambda 1$ and 175C to not be absorptive. Instead, 175C can act as a seed structure for the restoration process during the erase cycle. This would be beneficial for the purpose of decreasing the erasure time as the volume and absorption function can be enhanced through deposition methods. An additional benefit is to increase the number of potential materials that could be used for phase change/reset as the phase change parameters could then be tailored by process instead of dependent on the natural absorption function of bulk materials.

Figure 1D:
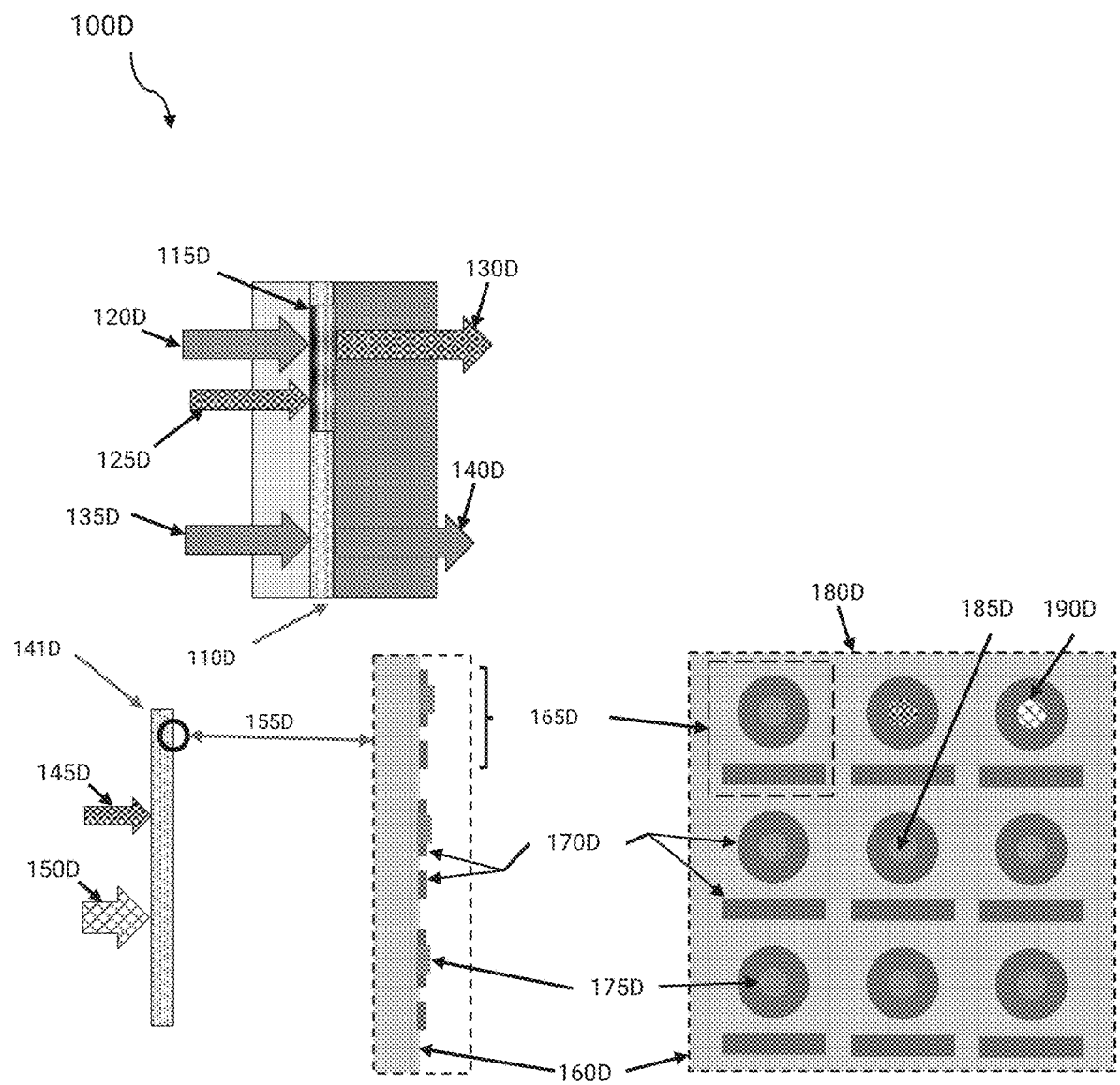
FIG. 1D illustrates metamaterial phase change light valve.

FIG. 1D illustrates metamaterial phase change light valve 100D. Metamaterial structure 110D is the active phase change material in the metamaterial phase change LV structure, 105D. The phase change modification is exemplified by 115D and can be either volume-based metamaterial or planar; examination of the detail, 155D, is shown as planar for clarity. An unpatterned high fluence beam (120D) enters 105D and interacts with 115D and becomes a patterned HFL beam (130D) upon leaving 105D wherever the patterned write/erase beam (125D) has caused 110D to undergo a phase change. The 120D operates at of $\lambda 1$ at t1 with a duration of $\tau 1$, while 125D operates at $\lambda 2/\lambda 3$, I2/I3, t2/t3 with a duration of $\tau 2/\tau 3$ for the write and erase beam, respectively. In areas not modified by 135D, a HFL beam 135D would enter 105D and not be affected with its passage through 110D and would remain an unpatterned HFL beam 140D. An examination of 110D is exemplified by 141D.

A write beam (145D) enters 141B-I; this beam is typically having a fluence that is short and intense so that (typically) I2>I3 and $\tau 2<\tau 3$. 145D is absorbed by the phase change material within 141D so that the material undergoes a phase change (as example) from crystalline to amorphous state, this process in $\tau 2$ timeframe and the material quickly stabilizes into a new amorphous before it can recrystallizes.

The amorphous state causes a change in the meta-material properties and its response to 120D. This response can be spectral, polarization, or a change 141D's complex impedance so that its transmissivity or reflectivity response at λ1 is affected and thus modifying 120D's amplitude, phase, polarization, or direction up leaving 105D. Since 145D performs this modification to 141D spatially, the outgoing 130D is modified is the same spatial pattern with the modified response. 145D can support gray scale and can produce varied levels of polycrystalline state to 141D from fully crystalline (pixel is not activated) to fully amorphous (pixel is fully activated).

An erase beam (150D) enters 141D and is absorbed within 141D so that the material undergoes phase change (as an example) from amorphous to crystalline and returns the metamaterial to its original state. 150D can be also patterned and can reset the pixels with equal gray scale level as that afforded by 145D.

Detail of 141D is shown in 155D which shows a small subset of planar metamaterial features. A volume equivalent can be realized of this array by using structured quantum dots in which the complex resonance can be formed using various shell materials and QD shapes (spheres versus ellipsoids versus platelets versus other volumetric shapes). A further detail examination of 155D is exemplified in 180D which depicts an array of metamaterial circuits atop a crystalline layer (160D) with 165D depicting an example of one potential meta-material circuit. This exemplary of a metamaterial circuit is composed of features 170D which resonates at λ1 and a control structure (175D) composed of the same crystalline material as that of 160D. When 145D illuminates 141D, it is focused at 175D and causes a phase change of this material so that it changes from crystalline to amorphous. This change causes a change to the resonant structure of 165D and its response to 120D, changing it to 130D. Likewise when 150D illuminates 141D, it is focused at 175D and can affect those pixels in 180D that were initially changed by 145D with a lower fluence over a longer pulse duration and in conjunction with the seed layer of 160D, will revert the affected regions that were made amorphous (or various levels of polycrystalline toward amorphous) back to a crystalline (or other levels of polycrystalline towards crystalline). Likewise, with illumination of 145D, 150D can affect the resonance of 180D and its response to 120D but is used to restore the state of 141D to its initial state. While it was stated that 145D and 150D operate at λ2/λ3, they could operate at the same wavelength λ2; their other parameters (I, t, and τ) would most likely be different as these are material dependent.

Figure 1E:
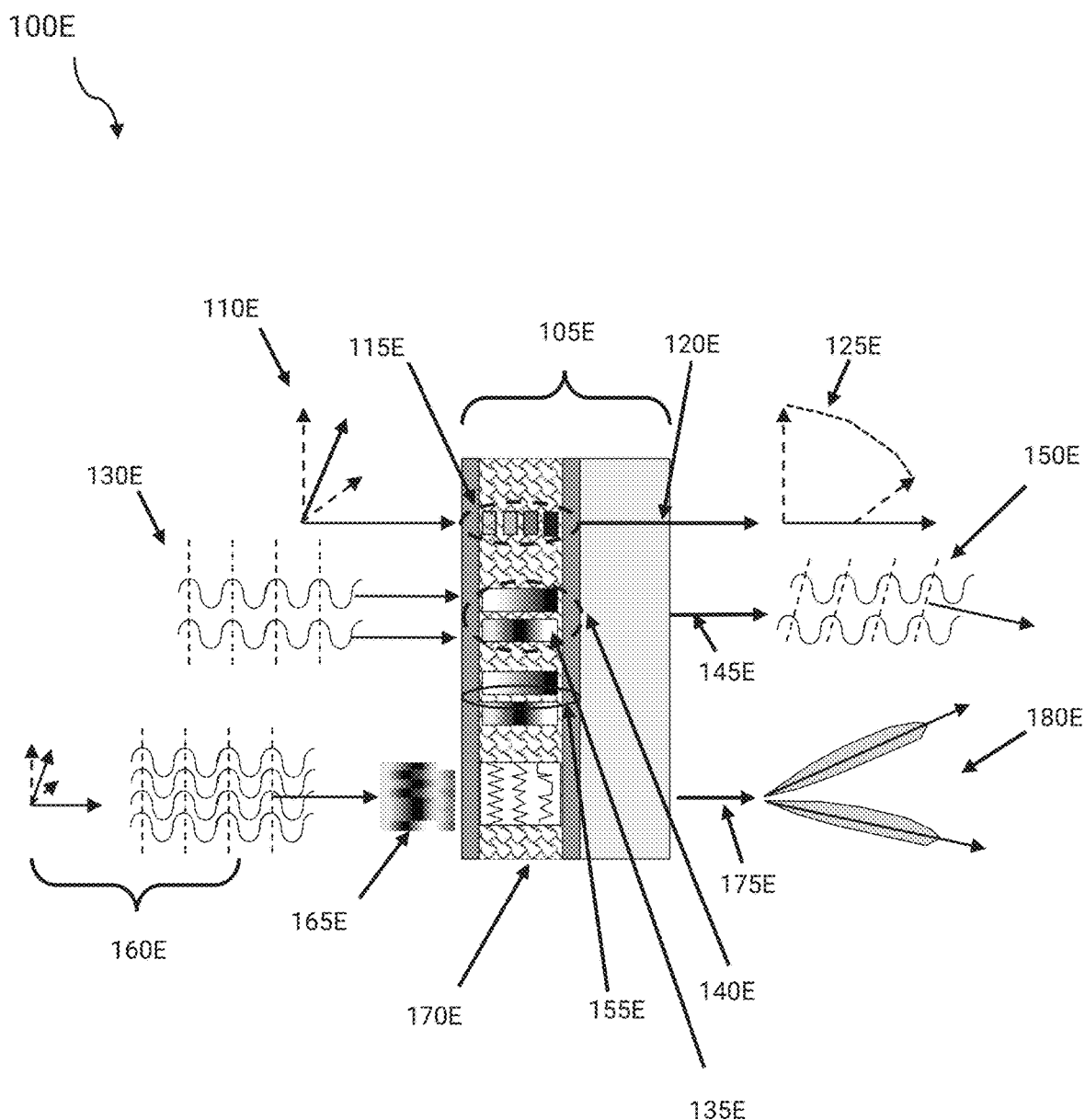
FIG. 1E illustrates a pixel strained phase change light valve.

FIG. 1E illustrates a pixel strained phase change light valve 100E. The phase change material can be either crystalline or. An unpatterned polarized HFL beam (110C) enters 105E and passes through a previously patterned voxel array (115E) which modifies the polarization state of 110E in an image wise fashion to create a patterned HFL beam (120E) that contains an elliptical polarization correlated to the created birefringence written into 115E. The action to create this birefringence is produced by creating strain between voxels (135E) in a volumetric patterned image exemplified by 140E which depicts two gray scale voxels with each voxel containing a variation in grayscale across any one layer within the voxel. As the material undergoes a differential phase change, strain occurs between the pixels that produces controlled birefringence in this area between pixels. These actions can be performed on either crystalline or amorphous materials. Moving the location of the image laterally in a plane (165C) will allow for a two-dimensional (2D) strain image to be generated, doing this for the entire volume will create a three-dimensional (3D) strain field (170C). The strain modifies the refractive index across this narrow region, creating a 2D index grating that when extended to the 3D strain field can produce useful functionality on 110C. Since the HFL is a coherent beam (130C), the strain induced index change will cause a differential change in the coherent direction of the output beam of 130E as it interacts and passes through 140E to become 145E with a direction depicted as 150E. If the phase change material in 105C is initially composed of crystalline material, it would be possible to simultaneously modify its polarization state as well as directional state to be able to produce an amplitude varying spatial image that can be angle manipulated depending on the strain pattern written in the voxels 115E. In the case where 130E is a coherent and polarized incoming beam to 105E as depicts in 160E and the pixel-strained voxel is created by overlapping regions (165C) in 3D throughout 115C, the resulting 3D strain (170C) would encode onto 160E a volumetric phase and amplitude structure and after passing through 105E would become 176C. The complex encoded 175E would allow single or multiple lobed (180C) output at a distance from 105C, allowing 105E to act as a dynamic phase array for a solid-state scanner and or image reformator. The overlapping portion, 165E is an extension of what was described in 155C.

Figure 1F:
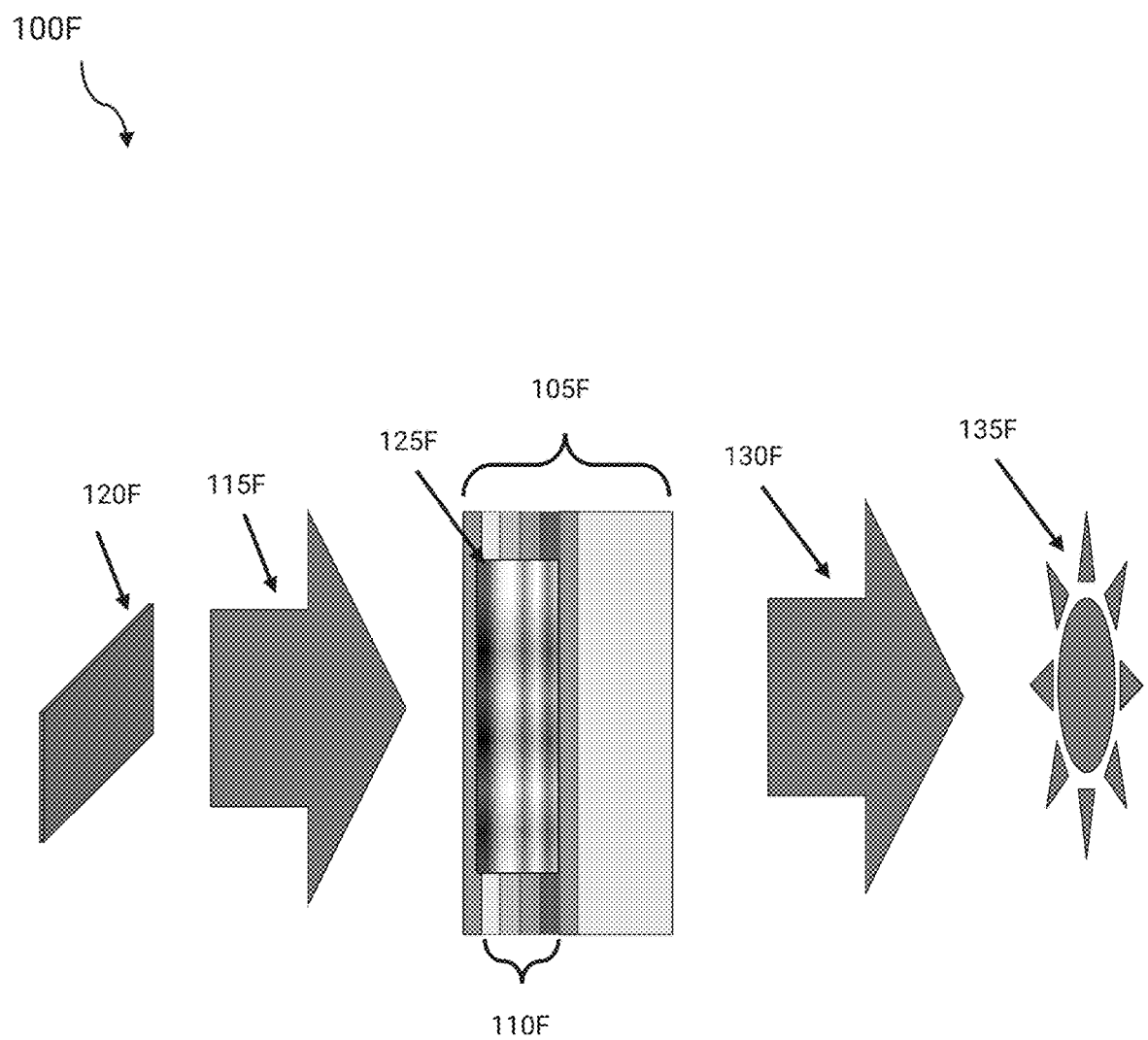
FIG. 1F illustrates a structured material strain phase change light valve.

FIG. 1F illustrates a structured material strain phase change light valve 100F. In this embodiment, structured materials are used as a replacement for either purely crystalline or amorphous phase change material. Structured materials would include the above set of materials but can be deposited instead of provided by naturally occurring formed layers. In this embodiment the structured material 110F is the phase change volume within a Strain Phase Change LV (105F). An incoming HFL (115F) that has a defined shape and can optionally be patterned (120F) enters into 105F and interacts with a previously encoded strain voxel 125F and, upon exiting 105F, contains this volumetric structure as 130F. The voxel information transferred to 120F that is now part of 130F permits the outgoing HFL to be image reformatted to attain an arbitrary profile and different patterning (135F) than 120F.

Figure 1G:
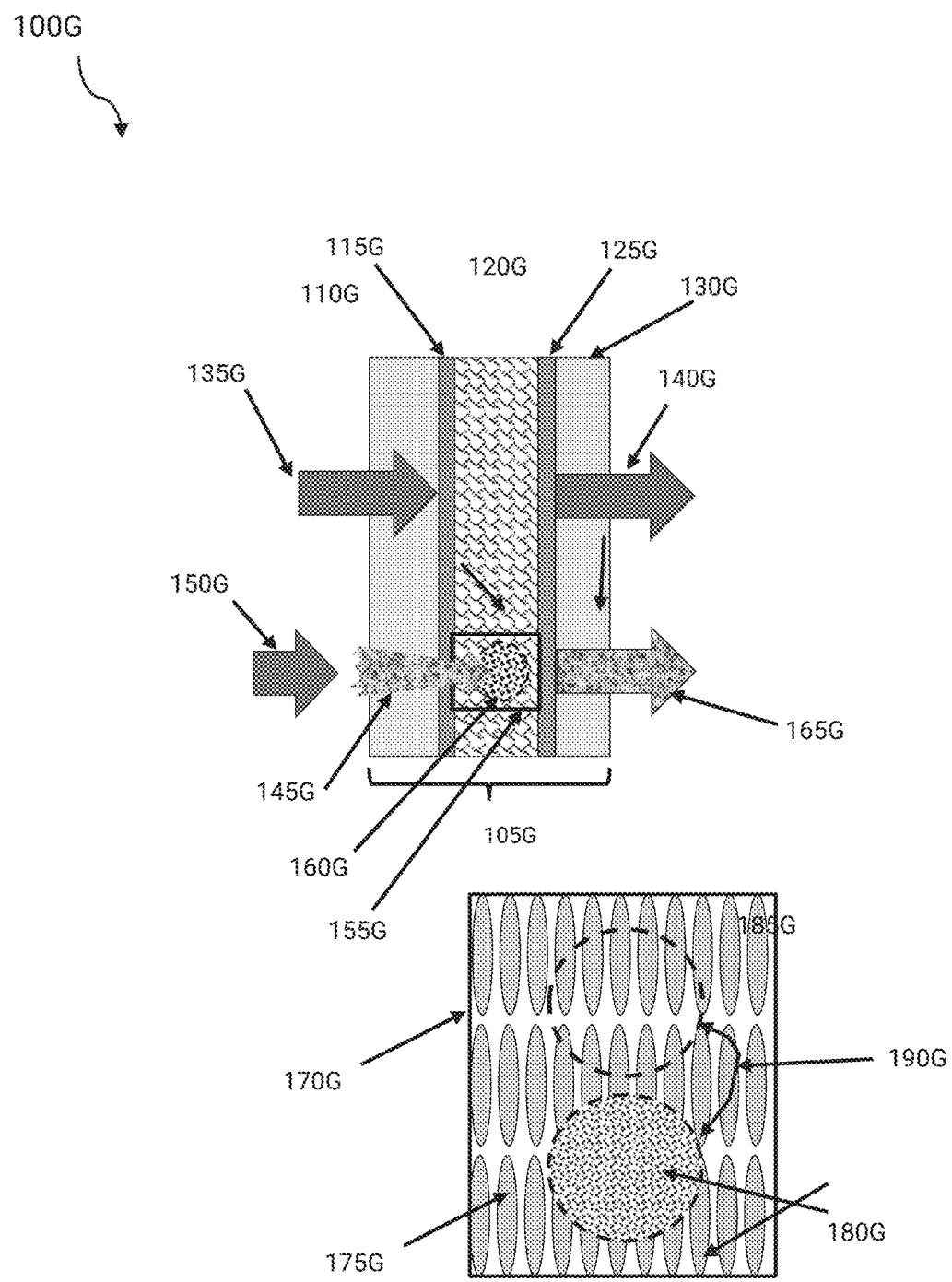
FIG. 1G illustrates a non-linear material phase change light valve.

FIG. 1G illustrates a non-linear material phase change light valve 100G. In this embodiment, materials having non-linear optical or electro-optical characteristics can be modified by write beam operating at λ2 that has no effect at λ1 (at HFL beam operating wavelength). One such material is Liquid Crystal (LC) in Nematic and Isotropic phases. There is a large number of LCs that normally exist in these phases, too numerous to name herein and, which their 3-order susceptibility (χ3) allows them to interact with an write/erase beam in (for example) the blue and UV ranges (and have λ2) their linear electro-optical characteristics be modified for the Near IR (NIR) wavelengths; these materials also have no modifying effects (either linear or non-linear) by the NIR beams. System 100G illustrates a phase change LV which uses this condition of modification via χ3 process. In a nonlinear activated phase change LV, the LV (105G) is composed a top substrate (110G), a top alignment layer (115G) which creates an initial pattern by which a volume of LC (120G) is oriented to it, a bottom alignment layer (125G) which allows a termination alignment arrangement for the LC, and a bottom substrate (130G). An unpatterned HFL beam (135G) enters 104G in an area not being addressed by a write beam and passes through 105G unaffected to become 140G; this beam goes into a beam dump or switchyard or otherwise is reformatted. In the areas in which a patterned write beam (145G) exist, the LC with 120G becomes activated (155G) through its χ3 susceptibility and undergoes a phase change between a Nematic (structured) and isotropic (unstructured) phases (160G). This change causes a large change in refractive index of volume of affected LC (155G) and allows an incoming unpatterned HFL (150G) to become patterned and leave 105G as a patterned HLFL beam (165G). An example of the phase change that is in voxel (155G) is shown in 170G in which symbolic detail of Nematic LC is shown as 185G with the LCs plane aligned with the substrates and each other throughout the volume 120G. When 145G illuminates a volume of 120G, the LC undergoes a phase change from Nematic to Isotropic (185G changes to 180G along 190G) and the refractive index at λ1 is changed allowing an unpatterned 150G to become a patterned 165G. The effect can be very fast, typically <10 us. Once the write beam ceases illumination of this voxel, the neighboring LC molecules cause the affected area to reorganized in a Nematic phase, occurring in 100's of microseconds and much less than 1 ms with the reversion of its refractive index back to the Nematic state, consequently changing 180G to 185G along with 190G.

Figure 1H:
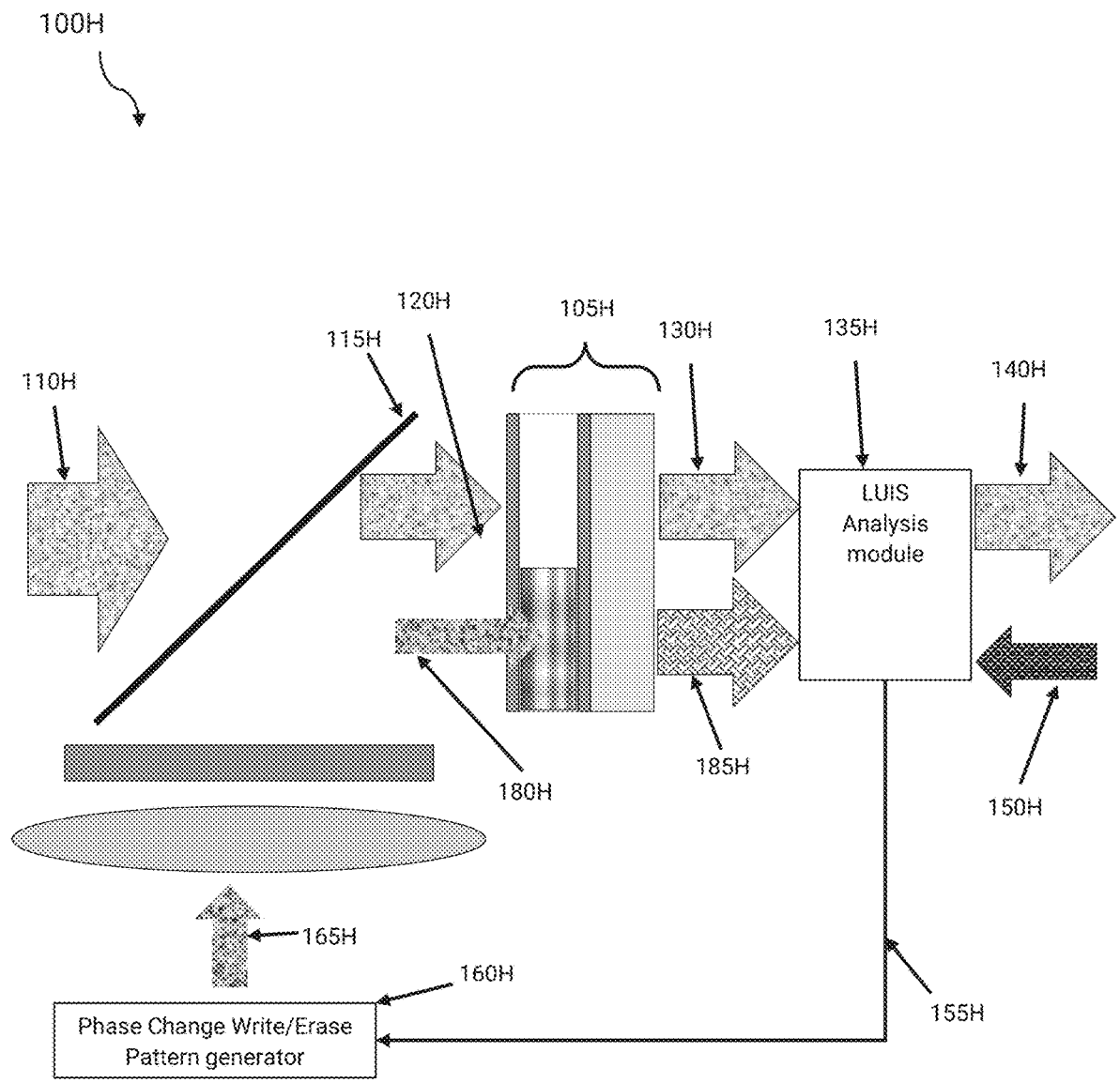
FIG. 1H illustrates a use of a phase change light valve in an adaptive optical structure.

FIG. 1H illustrates a use of a phase change light valve in an adaptive optical structure 100H. In this embodiment, a phase change LV is incorporated into a feedback loop by using a LUIS's Analysis module (which include this system's detection module) and LUIS' Image Transfer and Scanning Module, both of which are described in provisionally filed US application SEUR-04100.

In this arrangement, a phase change Light Valve (105H) is used as a secondary LV in a feedback correction system in a high fluence laser system which can include use in AM systems. In this configuration, a patterned HFL beam (110H) enters into the Adaptive Optical control loop system (100H) by passing through a dichroic beam splitter (115H) to become 120H (still a patterned HFL beam) which enters into and through 105H. The phase change LV (105H) is initially not activated and no pattern is contained in its phase change volume, thus 120H passes through 105H and becomes 130H. This initial (baseline) beam passes through the LUIS' Analysis Module (135H), with a portion of it remaining in to form a reference image, the rest propagating into the LUIS' Image Transfer and scanning assembly (145H). The image transfer assembly (145H) transfers 130H to a destination (this can be an AM bed, or other operational environment) where 130H interacts with an environment which disturbs and modifies its optical characteristics and which reflects some of this beam back through 145H to become a distorted version of 140H, depicted here as a feedback beam (150H). The feedback beam contains wavefront errors that represent potential print errors, unintentional and unwarranted print errors due to beam issues or optical defects that would corrupt current and future printed areas and which can change rapidly in time (and adaptable to modification via a feedback correction loop). This feedback beam (150H) comes back into 135H and gets analyzed with the help of baseline formed from 130H and forms a wavefront error (155H) output from 135H which is fed into the pattern generator (160H) which drives 105D. The pattern generator (160H) creates a pattern that is imprinted onto a Write/Erase Beam (165H) that passes through an imaging lens (170H), through an optical Phase LV (175H) and becomes collinear with 110H by way of 115H where it modifies 105H via 180H, creating a correction to 120H which then becomes a corrected HFL beam (185H). The corrected 185H undergoes the same process, further refining 110H. The correct beam (185H) interacts with all the elements and environments downstream which improves the initial aberrations and distortions evident on the initial 130H so that over time, these aberrations are minimized in real time.

Using the described embodiment of system 100H in additive manufacturing systems allows optical distortion such as linear optical aberrations and local hot/cold spots to be corrected, allowing for better resolved images on the printed part. Systemic fluctuations in melt pool due to localized temperature variations could be reduced so that density and shear pixels stress could be better controlled. Similar issues could be corrected if the 110H was part of a weapons-based system with atmospheric and delivered environments had similar aberrations. In general, system 100H can be used in any type of 110H systems in which aberrations exist in transport and end point delivery and which defects reduces the maximal energy/power exchange with the intended surface/volume.

A wide range of lasers of various wavelengths can used in combination with the described phase change light valve system. In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl$_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate (Nd:YVO$_4$) laser, Neodymium doped yttrium calcium oxoborateNd:YCa$_4$O(BO$_3$)$^3$ or simply Nd:YCOB, Neodymium glass (Nd:Glass) laser, Titanium sapphire (Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride (Ce:LiSAF, Ce:LiCAF), Promethium 147 doped phosphate glass (147Pm$^{+3}$:Glass) solid-state laser, Chromium doped chrysoberyl (alexandrite) laser, Erbium doped anderbium-ytterbium co-doped glass lasers, Trivalent uranium doped calcium fluoride (U:CaF$_2$) solid-state laser, Divalent samarium doped calcium fluoride (Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

Figure 2:
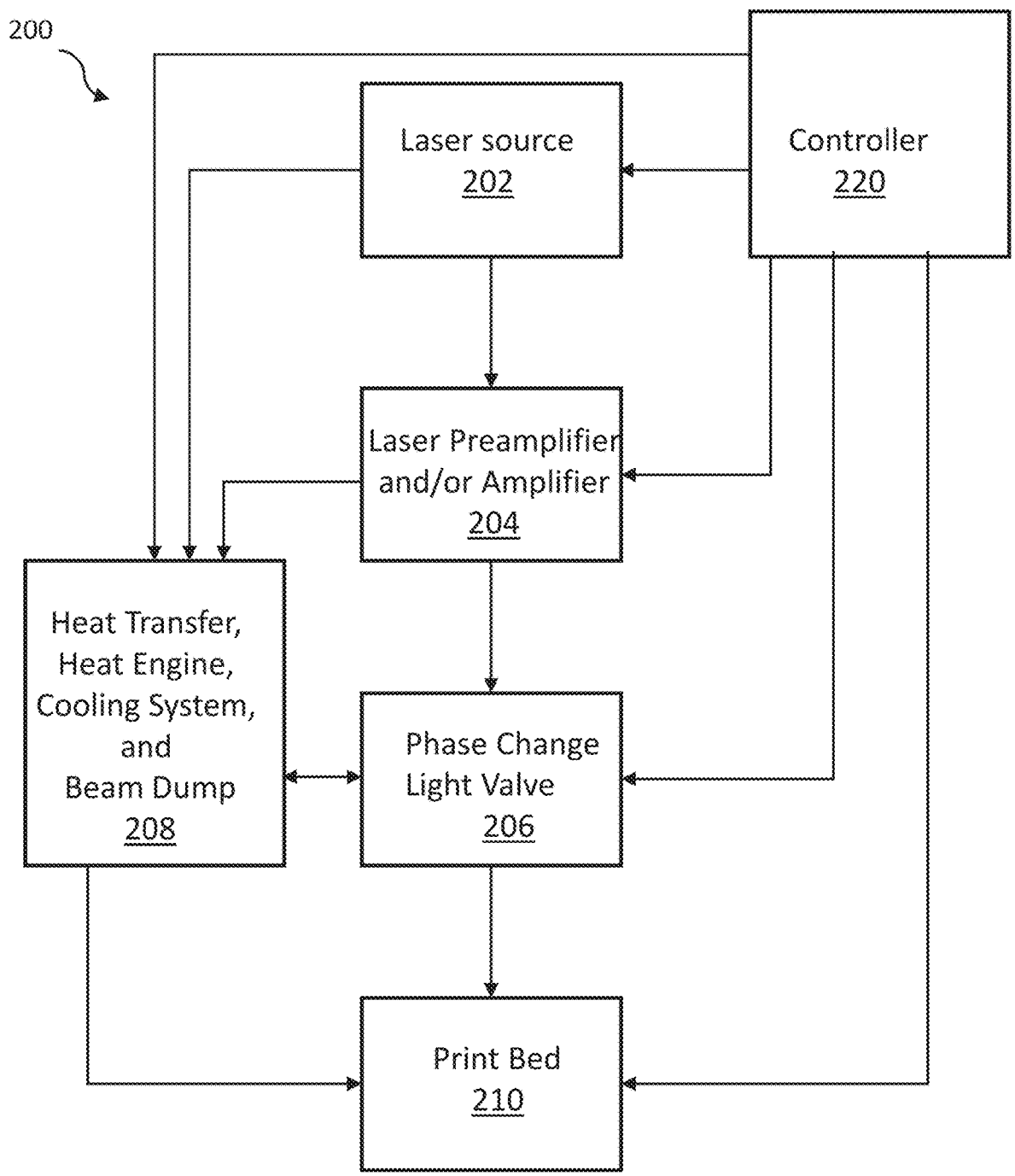
FIG. 2 illustrates a block diagram of a high fluence light valve based additive manufacturing system supporting a beam dump, a phase change light valve, and a heat engine.

FIG. 2 illustrates use of a phase change light valve such as disclosed herein in an additive manufacturing system 200. A laser source 202 directs a laser beam through a laser preamplifier and/or amplifier 204 into a phase change light valve 206. After patterning, light can be directed into a print bed 210. In some embodiments, heat or laser energy from laser source 202, laser preamplifier and/or amplifier 204, or an actively cooled light valve 206 can be actively or passively transferred to a heat transfer, heat engine, cooling system, and beam dump 208. Overall operation of the light valve based additive manufacturing system 200 can controlled by one or more controllers 220 that can modify laser power and timing.

In some embodiments, various preamplifiers or amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, or volume Bragg gratings. Pre-amplifier or amplifiers 204 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger). Amplifiers will typically be positioned to be the final units in a laser system 200 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 204 before going to the next stage. The number of pre-amplifiers 204 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to typical mechanical considerations (length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped. Both thermal energy and laser energy generated during operation can be directed the heat transfer, heat engine, cooling system, and beam dump 208.

Amplifiers can be configured in single and/or multi-pass or cavity type architectures. Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, thermal energy and laser energy generated during operation of system 200 can be directed into the heat transfer, heat engine, cooling system, and beam dump 208. Alternatively, or in addition, in some embodiments the beam dump 208 can be a part of a heat transfer system to provide useful heat to other industrial processes. In still other embodiments, the heat can be used to power a heat engine suitable for generating mechanical, thermoelectric, or electric power. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 3:
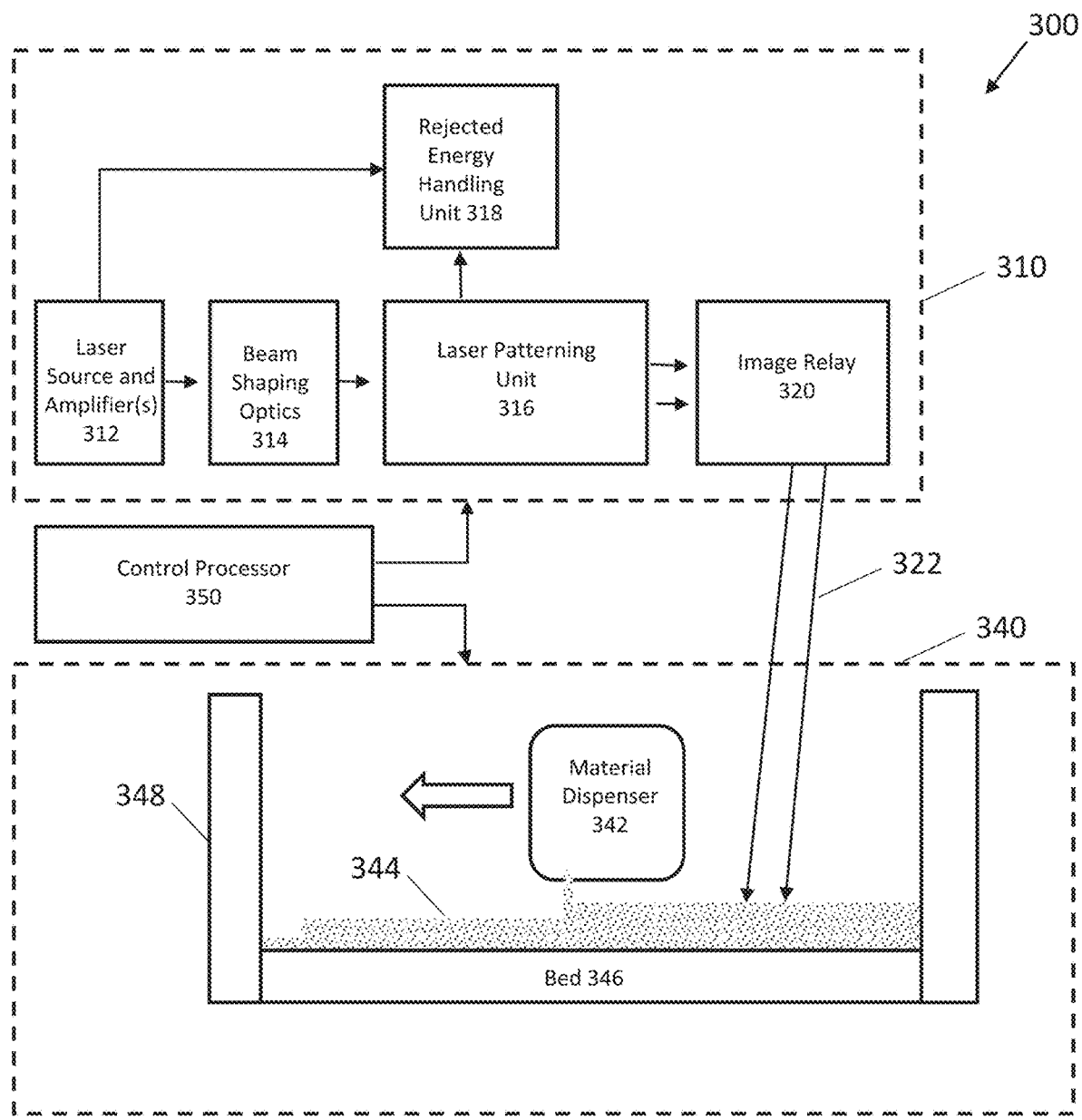
FIG. 3 illustrates a high fluence phase change light valve based additive manufacturing system.

FIG. 3 illustrates an additive manufacturing system 300 that can accommodate phase change light valves as described in this disclosure. As seen in FIG. 3, a laser source and amplifier(s) 312 can include phase change light valves and laser amplifiers and other components such as previously described. As illustrated in FIG. 3, the additive manufacturing system 300 uses lasers able to provide one or two dimensional directed energy as part of a laser patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316 that includes either a transmissive or reflective light valve, with generally some energy being directed to a rejected energy handling unit 318. The rejected energy handling unit can utilize heat provided by active of cooling of light valves such as discussed with respect to FIGS. 1A-1D.

Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source, light valve(s), and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system can be utilized in, for example and not limited to, laser-based additive manufacturing techniques where a mask is applied to the light. Advantageously, in various embodiments in accordance with the present disclosure, the thrown-away energy can be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, CO2, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2-$C_4H_6$, $C_5H_{12}$, n-$C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$—$CH_3$, $C_8H_{10}$, $C_2H_5OH$, $CH_3OH$, $iC_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed can be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever changing mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed can be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed can be collected in a hopper for reuse in later print jobs. The powder collecting process can be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) can be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system can maintain gaseous oxygen within the enclosure at concentrations below the atmospheric level. In some embodiments, a wheeled vehicle can transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection can be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
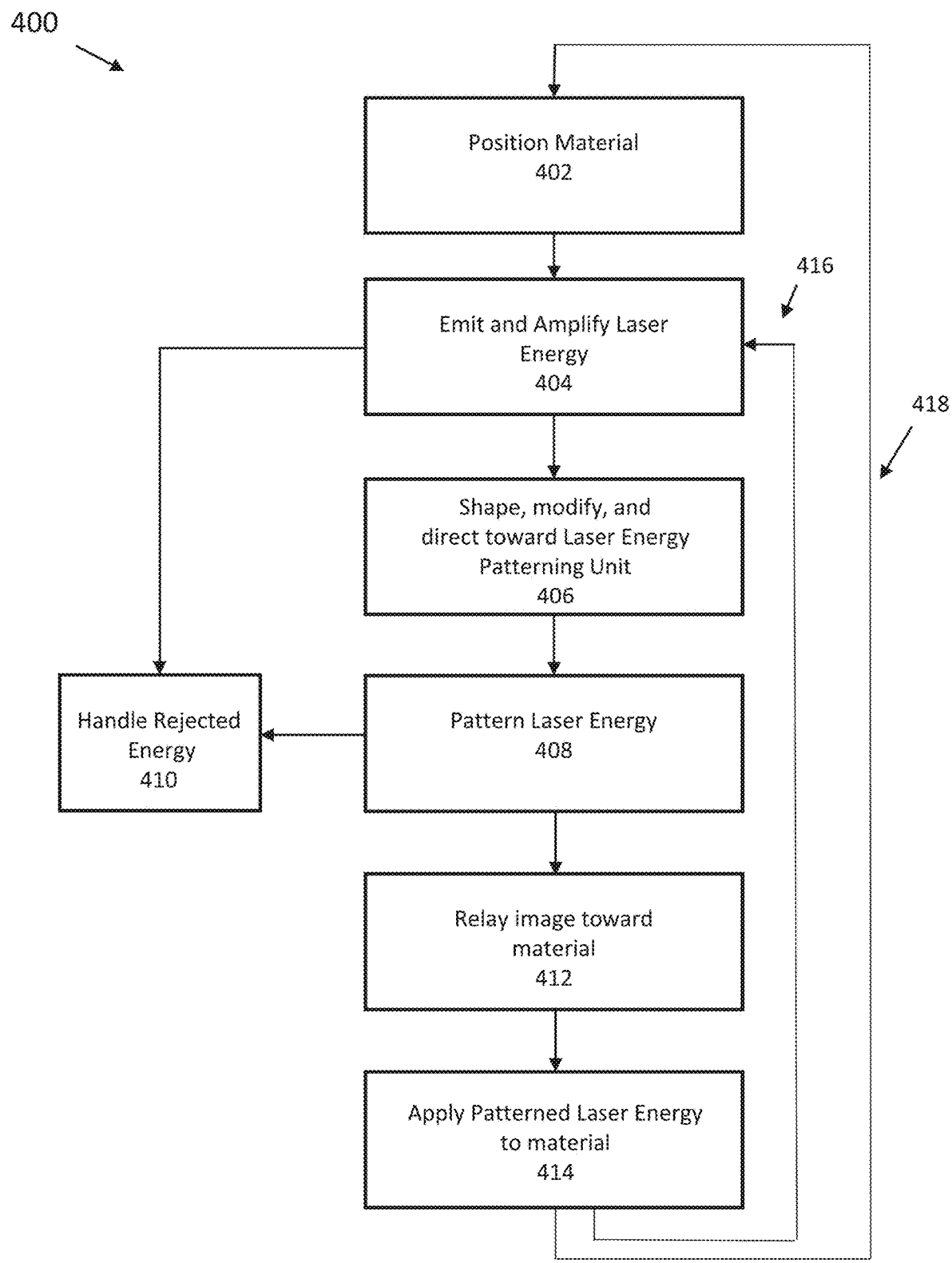
FIG. 4 illustrates another embodiment of a high fluence phase change light valve based additive manufacturing system.

One embodiment of operation of a manufacturing system supporting use of a phase change light valve suitable for additive or subtractive manufacture is illustrated in FIG. 4. In this embodiment, a flow chart 400 illustrates one embodiment of a manufacturing process supported by the described optical and mechanical components. In step 402, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned by a phase change light valve, with energy not forming a part of the pattern being handled in step 410 (this can include use of a beam dump as disclosed with respect to FIG. 2 and FIG. 3 that provide conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 416) until the image (or different and subsequent image) has been applied to all necessary regions of a top layer of the material. When application of energy to the top layer of the material is finished, a new layer can be applied (loop 418) to continue building the 3D structure. These process loops are continued until the 3D structure is complete, when remaining excess material can be removed or recycled.

Figure 5:
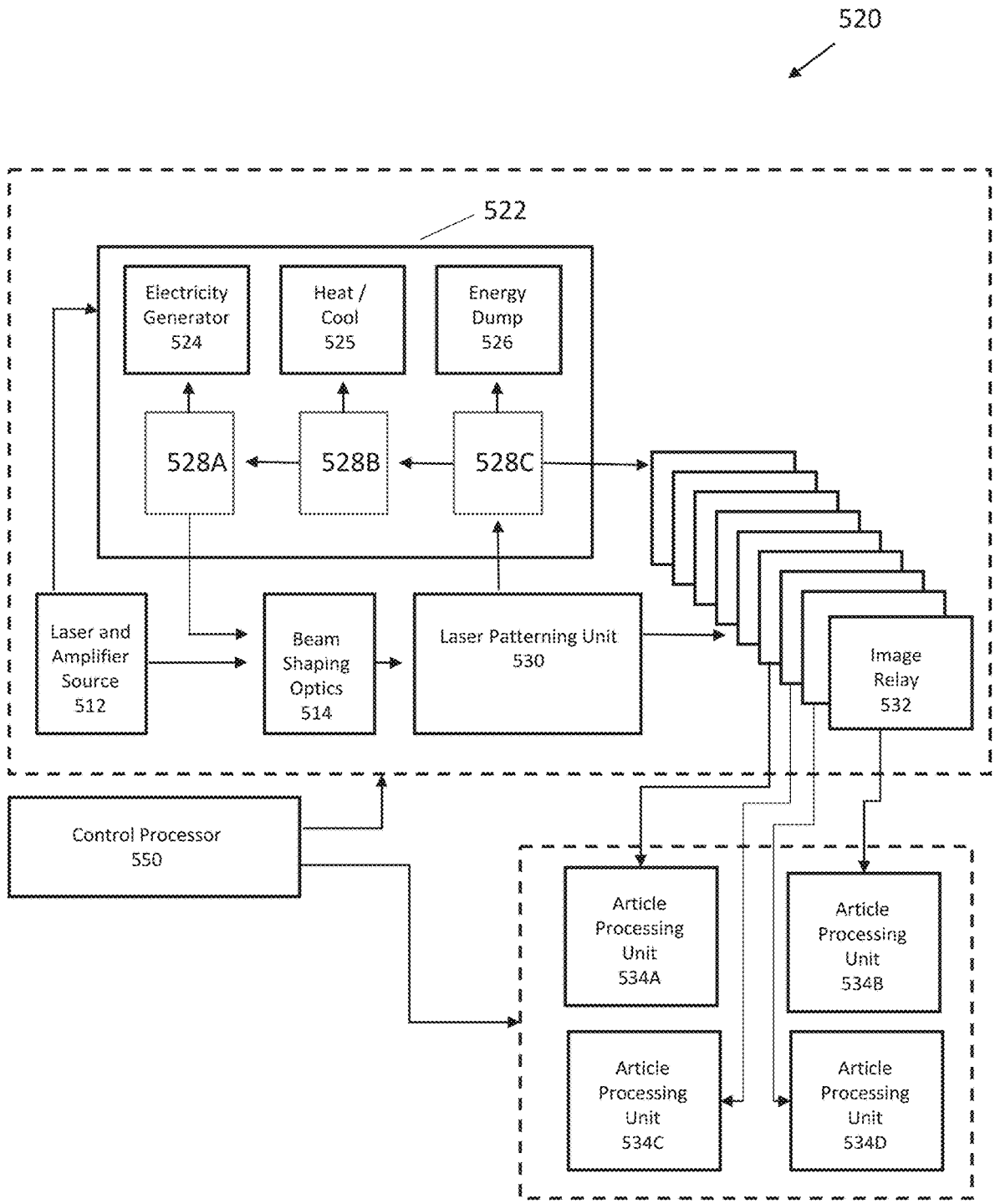
FIG. 5 illustrates another embodiment of a high fluence phase change light valve based additive manufacturing which incorporates a switchyard approach for recovery and further usage of waste energy.

FIG. 5 is one embodiment of an additive manufacturing system that includes a phase change light valve and a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522 that can include an active light valve cooling system as disclosed with respect to FIGS. 1A-1D, FIG. 2, FIG. 3, and FIG. 4. After shaping, the beam is two-dimensionally patterned by an energy patterning unit 530 based on phase change material, with generally some energy being directed to the rejected energy handling unit 522. Patterned energy is relayed by one of multiple image relays 532 toward one or more article processing units 534A, 534B, 534C, or 534D, typically as a two-dimensional image focused near a movable or fixed height bed. The bed be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 528C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub-patterned, or otherwise transformed for distribution to one or more article processing units. 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention can be practiced in the absence of an element/step not specifically disclosed herein.

The invention claimed is:

1. An additive manufacturing system, comprising:
 a laser to form a laser beam at a first wavelength;
 a 2D patternable light valve including a phase change material that changes phase responsive to being illuminated by a write beam at a second wavelength that is different from the first wavelength, and which does not change phase when illuminated by the laser beam at the first wavelength,
 wherein the write beam is a patterned beam that changes the phase of one or more portions of the phase change material to impose a pattern in the phase change material, and the laser beam of the first wavelength interacting with the phase change material generates a two-dimensionally patterned beam for modifying a material that is used to form a structure.

2. The additive manufacturing system of claim 1, wherein the phase change material supports volumetric phase change.

3. The additive manufacturing system of claim 1, wherein the phase change material is a quantum dot phase change material.

4. The additive manufacturing system of claim 1, wherein the phase change material phase change material is a metamaterial phase change material.

5. The additive manufacturing system of claim 1, wherein the phase change material is a pixel strained phase change material.

6. The additive manufacturing system of claim 1, wherein the phase change material is a structured material.

7. The additive manufacturing system of claim 1, wherein the phase change material is a non-linear material phase change material.

8. The additive manufacturing system of claim 1, wherein the phase change material further changes from the amorphous state to the crystalline state responsive to an erase beam.

9. The additive manufacturing system of claim 1, wherein the 2D patternable light valve is incorporated in an adaptive optical structure.

10. The additive manufacturing system of claim 1, further comprising a switch yard system, wherein the two-dimensionally patterned beam is directed to the switchyard system to reuse at least a portion of patterned two-dimensional energy of the two-dimensionally patterned beam.

\* \* \* \* \*